(12) United States Patent
Isobe (10) Patent No.: US 12,342,893 B2
(45) Date of Patent: Jul. 1, 2025

(54) SCREEN DEVICE AND HELMET (71) Applicant: SHOEI CO., LTD., Tokyo (JP)

(72) Inventor: Eiji Isobe, Tokyo (JP)

(73) Assignee: SHOEI CO., LTD., Tokyo (JP)

( * ) Notice: Subject to any disclaimer, the term of this patent is extended or adjusted under 35 U.S.C. 154(b) by 0 days.

(21) Appl. No.: 18/253,260

(22) PCT Filed: Aug. 11, 2021

(86) PCT No.: PCT/JP2021/029671
§ 371 (c)(1),
(2) Date: May 17, 2023

(87) PCT Pub. No.: WO2022/158013
PCT Pub. Date: Jul. 28, 2022

(65) Prior Publication Data
US 2024/0008577 A1    Jan. 11, 2024

(30) Foreign Application Priority Data

Jan. 19, 2021 (JP) .................. 2021-006412

(51) Int. Cl.
*G02B 27/01* (2006.01)
*A42B 3/04* (2006.01)

(52) U.S. Cl.
CPC .......... *A42B 3/042* (2013.01); *G02B 27/0176* (2013.01)

(58) Field of Classification Search
None
See application file for complete search history.

(56) References Cited

U.S. PATENT DOCUMENTS 4,867,551 A * 9/1989 Perera ................. G04B 47/00
968/398
2006/0007562 A1   1/2006 Willey et al.
(Continued)

FOREIGN PATENT DOCUMENTS

| CN | 111694153 A | 9/2020 |
|---|---|---|
| JP | 2007092244 A | 4/2007 |
| JP | 2020100906 A | 7/2020 |

OTHER PUBLICATIONS

International Search Report for International Application No. PCT/JP2021/029671, Filing Date Aug. 11, 2021, Date of Mailing Sep. 7, 2021, 2 pages.

(Continued)

*Primary Examiner* — Joseph R Haley
(74) *Attorney, Agent, or Firm* — CANTOR COLBURN LLP (57) ABSTRACT

A screen device is configured to be attached to a helmet and includes a support and a combiner. The support includes a rail portion that supports the combiner. The combiner includes a projection surface, onto which an image projected from a projector attached to the helmet is presented, and a supported portion, supported by the rail portion. The rail portion supports the supported portion to be movable between a display position where the projection surface is arranged in front of a wearer of the helmet and a retraction position where the projection surface is retracted away from the front of the wearer. The support further includes a positioner that positions the supported portion supported by the rail portion. The positioner is configured to position the supported portion when the positioner is externally operated in at least one of the display position and the retraction position.

5 Claims, 7 Drawing Sheets

(56) References Cited

U.S. PATENT DOCUMENTS

2022/0022585 A1   1/2022  Shoei
2022/0155597 A1*  5/2022  Berger ................... G09G 3/002

OTHER PUBLICATIONS

European Search Report for European Patent Application No. 21921118.2, Date of Mailing: Sep. 27, 2024, 8 pages.

* cited by examiner

SCREEN DEVICE AND HELMET

TECHNICAL FIELD

The present disclosure relates to a screen device onto which an image is projected and a helmet including the screen device.

BACKGROUND ART

A known head-mounted display (HMD) is arranged in a helmet for a motorcycle. A screen device, which is one example of an HMD, includes a combiner with a half-mirror structure. The combiner reflects an image, projected by a projector arranged inside the helmet, with a projection surface to display a virtual image. For example, Patent Document 1 describes a screen device movable between a display position, or the first position, where the projection surface enters the field of view of a wearer and a retraction position, or the second position, where the projection surface moves out of the field of view of the wearer.

CITATION LIST

Patent Literature

Patent Literature 1: Japanese Laid-Open Patent Publication No. 2020-100906

SUMMARY OF INVENTION

Technical Problem

It is desirable that the positions where the combiner is supported in the helmet be adjustable in accordance with a driving posture or the like. For example, it is preferable that the information displayed on the projection surface be slightly separated from the line of sight of the wearer so that the wearer can concentrate on driving. Further, it is preferable that the wearer be able to check the information displayed on the projection surface just by slightly moving his or her line of sight in order to reduce eyestrain and maintain safety during driving. The view points of the wearer relative to the combiner change in accordance with the driving posture or the like that is unique to the wearer. Thus, information may not be presented to the wearer in a preferred manner. There is a strong demand for a technique that allows for adjustment of positions where the combiner is supported so that the combiner can be retracted to a preferred position.

Solution to Problem

A screen device according to one aspect of the present disclosure is configured to be attached to a helmet. The screen device includes a support including a rail portion that supports a combiner and the combiner including a projection surface, onto which an image projected from a projector attached to the helmet is presented, and a supported portion, supported by the rail portion. The rail portion supports the supported portion to be movable between a display position where the projection surface is arranged in front of a wearer of the helmet and a retraction position where the projection surface is retracted away from the front of the wearer. The support further includes a positioner that positions the supported portion supported by the rail portion. The positioner is configured to position the supported portion when the positioner is externally operated in at least one of the display position and the retraction position.

A helmet according to another aspect of the present disclosure includes a screen device and a projector that projects an image on the screen device. The screen device includes a support including a rail portion that supports a combiner, and the combiner including a projection surface, onto which the image projected from the projector is presented, and a supported portion, supported by the rail portion. The rail portion supports the supported portion to be movable between a display position where the projection surface is arranged in front of a wearer of the helmet and a retraction position where the projection surface is retracted away from the front of the wearer. The support further includes a positioner that positions the supported portion supported by the rail portion. The positioner is configured to position the supported portion when the positioner is externally operated in at least one of the display position and the retraction position.

DESCRIPTION OF EMBODIMENTS

A helmet and a screen device according to one embodiment will now be described with reference to FIGS. 1 to 9. In FIGS. 1 to 9, the forward, rearward, leftward, rightward, upward, and downward directions as viewed from a wearer of a helmet are used as a frame of reference for the forward, backward, leftward, rightward, upward, and downward directions of the helmet.

Helmet

Figure 1:
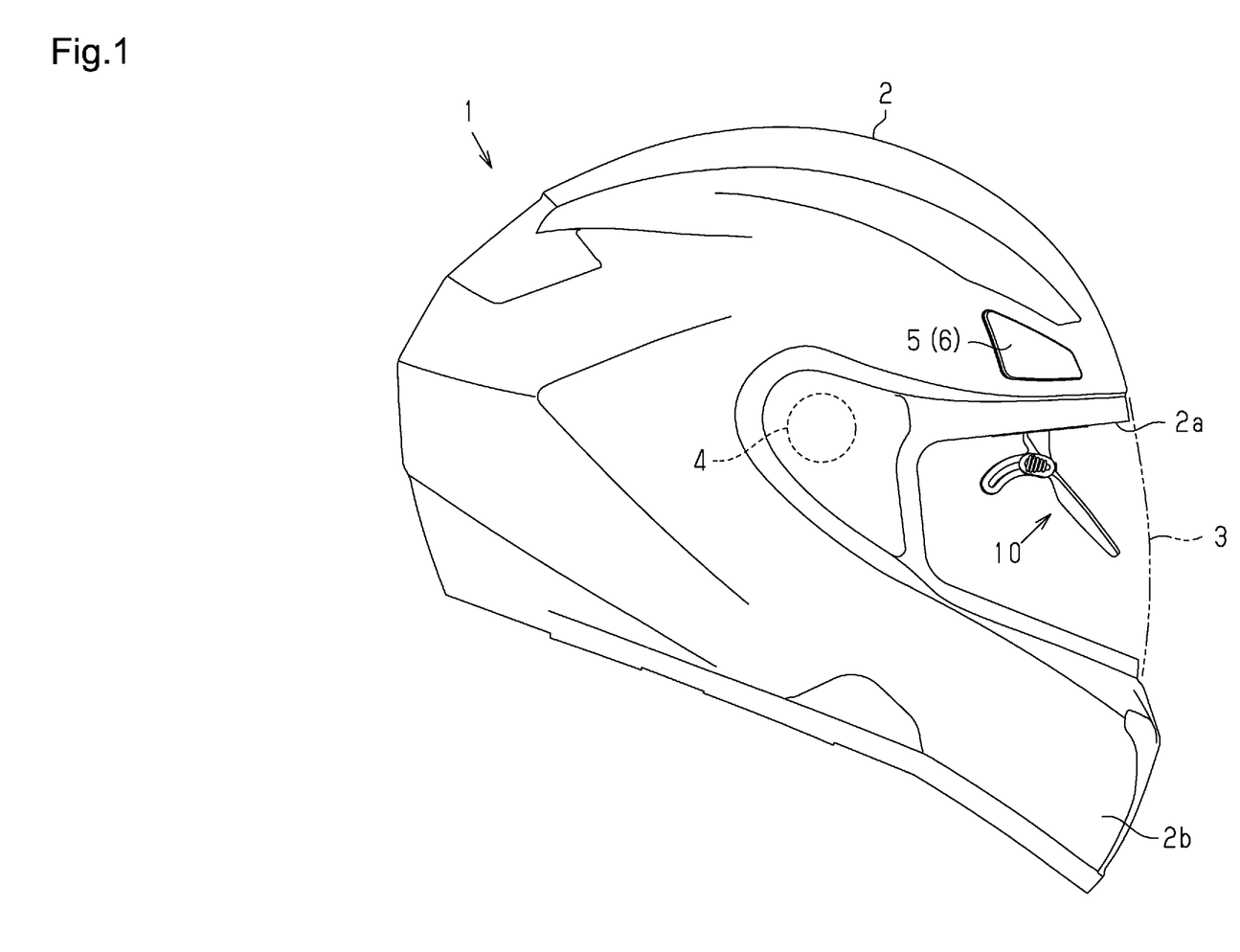
FIG. 1 is a side view of a helmet according to one embodiment.

As shown in FIG. 1, a helmet 1 is a full-face helmet. The helmet 1 includes a helmet body 2 and a screen device 10. The helmet body 2 forms the shell of the helmet. The helmet body 2 is a hemispherical plastic member. The helmet body 2 is made of a material that is selected from, for example, acrylonitrile-butadiene-styrene (ABS) copolymer, polycarbonate (PC), thermosetting resin impregnated with reinforcing fibers, and the like.

The helmet body 2 includes an opening 2a that is open toward the front and a chin guard 2b that is located downward from the opening 2a. The opening 2a obtains a field of view for a wearer. A shield 3 serving as a light-transmissive plate member is arranged in the opening 2a.

The shield 3 is configured to be movable between an open position and a closed position. The shield 3 opens the opening 2a at the open position. The shield 3 closes the opening 2a at the closed position as shown by the long-dash double-short-dash line in FIG. 1. The shield 3 at the closed position prevents foreign material, rainwater, or wind coming from the front from entering the helmet 1 and improves visibility for the wearer.

The helmet body 2 includes right and left support mechanisms 4. The support mechanisms 4 are arranged at the right and left ends of the opening 2a. The support mechanisms 4 support the shield 3 to be movable between the open position and the closed position.

The helmet body 2 includes a liner (not shown) serving as an interior member that absorbs impact. The liner is shaped in conformance with the inner surface of the helmet body 2. The liner is made of, for example, resin foam such as styrene foam.

Screen Device

The screen device 10 is attached by an attachment unit 5 to a portion of the helmet body 2 that is located upward from the opening 2a. The screen device 10 extends downward into a space formed by the opening 2a. The attachment unit 5 forms part of the outer surface of the helmet body 2 and is seamless with the surrounding surface on the outer surface of the helmet body 2.

Figure 2:
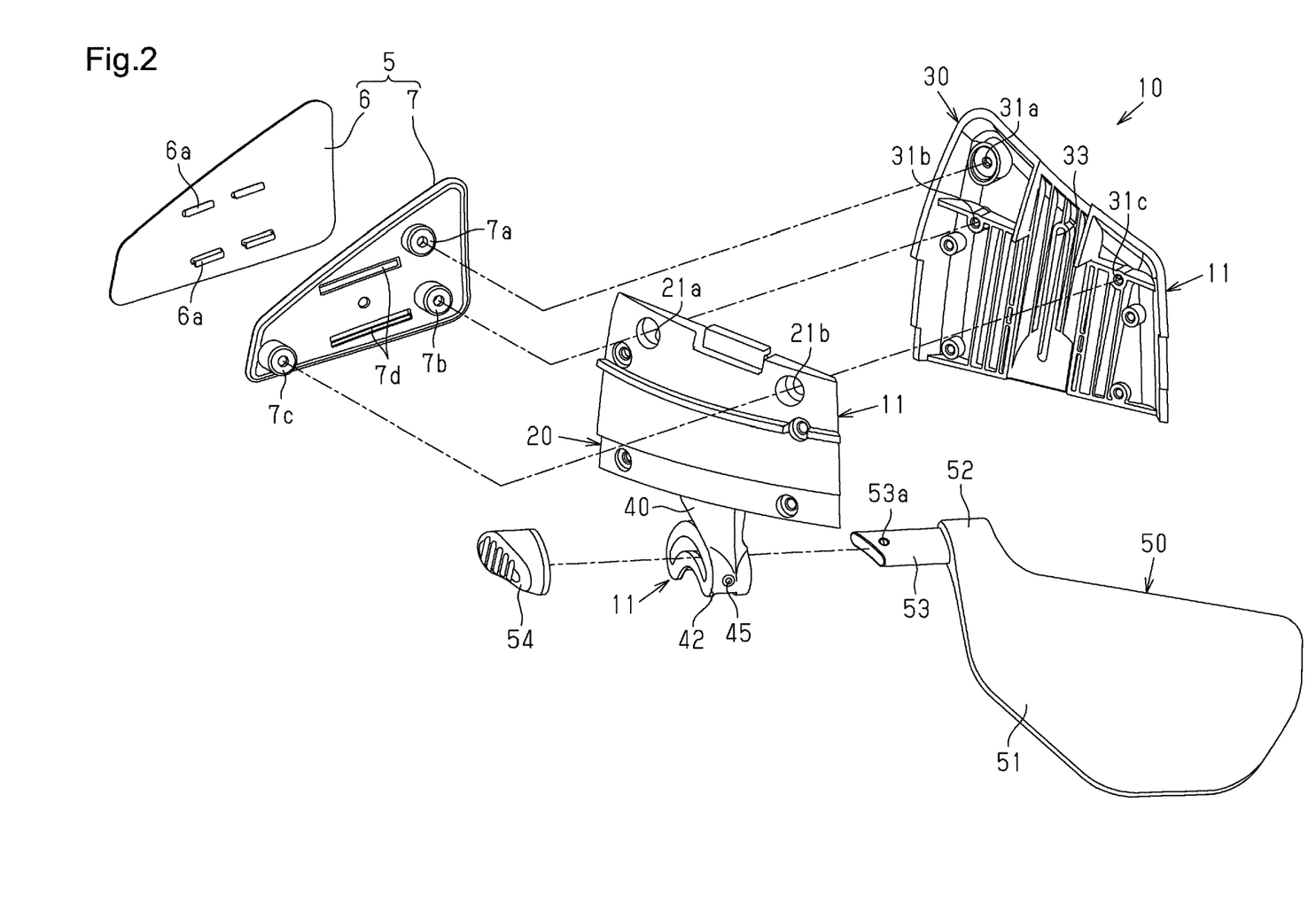
FIG. 2 is an exploded perspective view of a screen device and an attachment portion of the helmet of FIG. 1.

As shown in FIG. 2, the attachment unit 5 includes an outer member 6 and an inner member 7. The outer member 6 is located toward the outer side of the helmet 1 from the inner member 7 and forms part of the outer surface of the helmet body 2. The outer member 6 includes engagement portions 6a serving as clasping projections.

The inner member 7 is located toward the inner side of the helmet 1 from the outer member 6. The inner member 7 includes engagement holes 7d that are engaged with the engagement portions 6a. Engagement of the engagement portions 6a and the engagement holes 7d integrally joins the outer member 6 and the inner member 7 thereby forming the attachment unit 5.

The inner member 7 includes a first projection 7a, a second projection 7b, and a third projection 7c that extend into the helmet 1. The first projection 7a, the second projection 7b, and the third projection 7c of the attachment unit 5 extend through the helmet body 2 and are connected to the screen device 10 arranged inside the helmet body 2. This fixes the screen device 10 to the helmet body 2 with the attachment unit 5.

The screen device 10 includes a vertical movement mechanism 11 and a combiner 50. The vertical movement mechanism 11 supports the combiner 50 to be vertically movable. The combiner 50 is, for example, a transmissive screen with a half-mirror structure.

The vertical movement mechanism 11 includes a first member 20, a second member 30, and a support 40. The first member 20 and the second member 30 are arranged between the helmet body 2 and the liner. The first member 20 faces the inner surface of the helmet body 2. The second member 30 faces the liner.

The first member 20 includes through-holes 21a, 21b. The second member 30 includes insertion holes 31a, 31b, 31c. The first projection 7a is inserted into the insertion hole 31a and fixed by a screw or the like. The second projection 7b is inserted through the through-hole 21a into the insertion hole 31b and fixed by a screw or the like. The third projection 7c is inserted through the through-hole 21b into the insertion hole 31c and fixed by a screw or the like.

The support 40 is arranged between the first member 20 and the second member 30 and held to be vertically movable. The support 40 has a lower end that extends downward from the first member 20 and the second member 30. The lower end of the support 40 includes a rail portion 42. The combiner 50 includes a supported portion 53 that is inserted into the rail portion 42. The combiner 50 is supported by the support 40 by attaching a fastener 54 to the distal end of the supported portion 53.

Vertical Movement Mechanism

Figure 3:
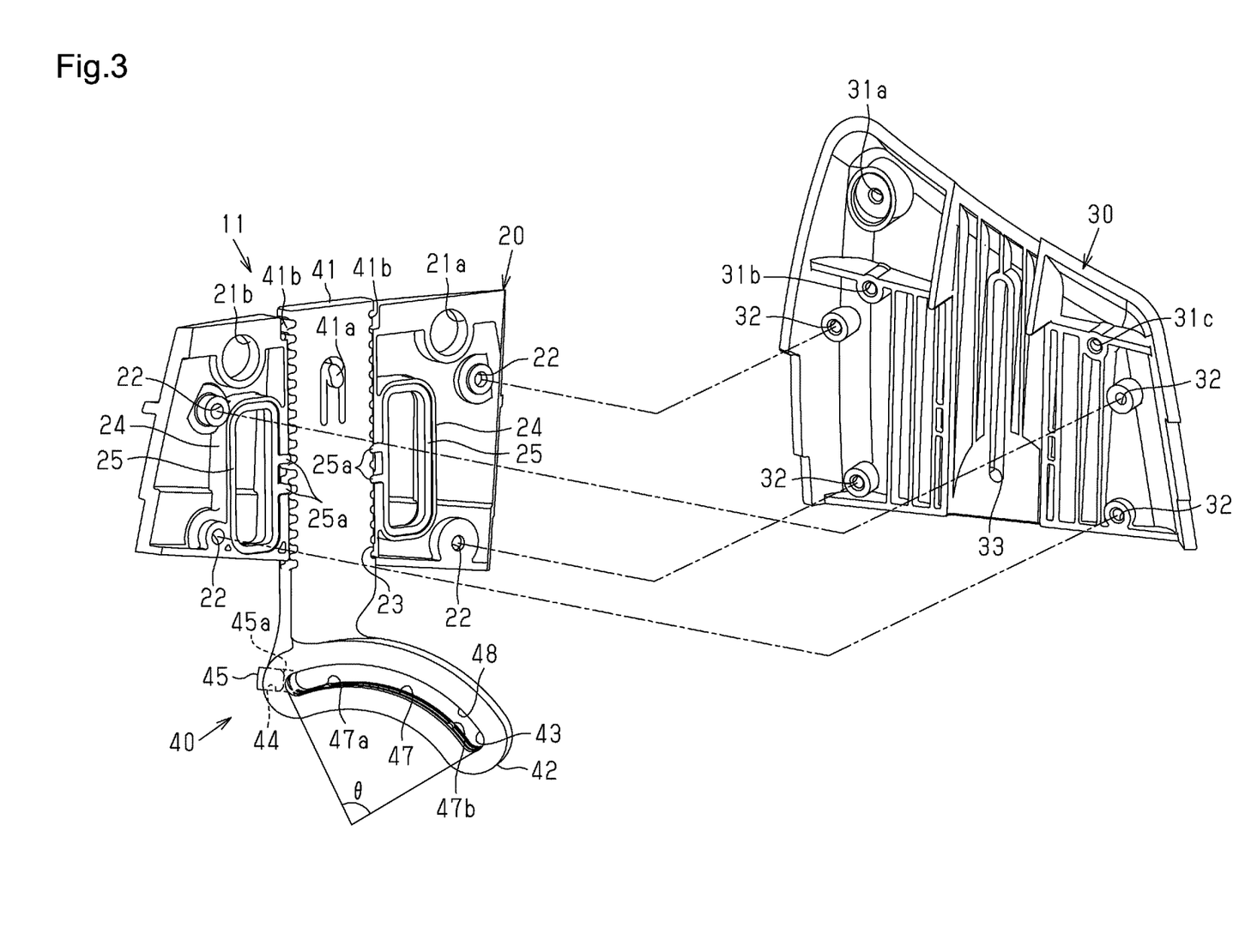
FIG. 3 is an exploded perspective view of a vertical movement mechanism of the screen device of FIG. 2.

As shown in FIG. 3, the first member 20 includes the through-holes 21a, 21b and first connection portions 22 described above. The second member 30 includes second connection portions 32. The first member 20 and the second member 30 are connected by fastening the first connection portions 22 and the second connection portions 32 with screws.

The first member 20 includes a guide portion 23 and two accommodating portions 24 arranged at the sides of the guide portion 23. The guide portion 23 is a groove extending vertically in the surface facing the second member 30. The support 40 is arranged in the guide portion 23. The accommodating portions 24 are defined by belt-shaped walls arranged on the surface facing the second member 30. The accommodating portions 24 each include a cutout that extends toward the guide portion 23. The accommodating portion 24 accommodates a holding member 25.

The holding member 25 is loop-shaped in conformance with the accommodating portion 24. Two projections 25a extend from the outer surface of the holding member 25. The holding member 25 is arranged so that the projections 25a extend through the cutout of the accommodating portion 24 toward the guide portion 23. The projections 25a are engaged with a serrated portion 41b in the side surface of a plate 41 of the support 40. This holds the support 40 in the guide portion 23 at a given position in the vertical direction.

The second member 30 is shaped in correspondence with the first member 20 and extends upward from the first member 20. The second member 30 includes the insertion holes 31a, 31b, 31c and the second connection portions 32 described above.

The second member 30 further includes a guide groove 33 extending in the vertical direction. The guide groove 33 engages a guide projection 41a of the support 40 and sets the movable range of the support 40 in the vertical direction.

The support 40 includes the plate 41 and the rail portion 42. The plate 41 of the support 40 is arranged in the guide portion 23. The plate 41 is rectangular parallelepiped and elongated in the vertical direction in conformance with the guide portion 23.

The plate 41 includes the guide projection 41a that projects toward the second member 30 and the saw-toothed serrated portions 41b. The guide projection 41a is arranged on the surface of the plate 41 facing the second member 30 and engaged with the guide groove 33 of the second member 30.

The serrated portions 41b are arranged on the side surfaces of the plate 41. The serrated portions 41b are each formed by recesses and projections alternately arranged in the vertical direction. The recesses of the serrated portion 41b are engaged with the projections of the holding member 25. Engagement of the serrated portions 41b with the projections allows the position of the support 40 relative to the first member 20 and the second member 30 in the vertical direction to be changed in intervals corresponding to the recesses of the serrated portion 41b.

The support 40 is supported to be vertically movable relative to the first member 20 and the second member 30 so that the combiner 50 supported by the support 40 can be arranged at a vertical position that is suited for the field of view of a wearer. The position of the combiner 50 in the vertical direction can be easily adjusted.

The rail portion 42 is arranged below the plate 41. The rail portion 42 has a curved shaped and extends from the front to the rear about a point below the rail portion 42 so as to form an arc having central angle θ. The rail portion 42 includes a rail hole 43 that extends through in the right-left direction and extends along the arcuate rail portion 42. The supported portion 53 of the combiner 50 is inserted into the rail hole 43.

A screw hole 44 extends through the front end of the rail portion 42 in the front-rear direction. A screw 45 serving as a positioner is joined with the screw hole 44. The screw 45 includes a driving portion that extends in the axial direction and is engaged with a tool or the like. When the driving portion is engaged with the tool and rotated, the screw 45 is driven in the front-rear direction, which is a thrust direction.

When the screw 45 is externally operated using a tool or the like and rotated, a distal end 45a of the screw 45 projects into the rail hole 43 and sets the movable range of the supported portion 53 in the rail hole 43. That is, the distal end 45a of the screw 45 serves as an abutment portion that positions the supported portion 53 in the rail hole 43.

Figure 4:
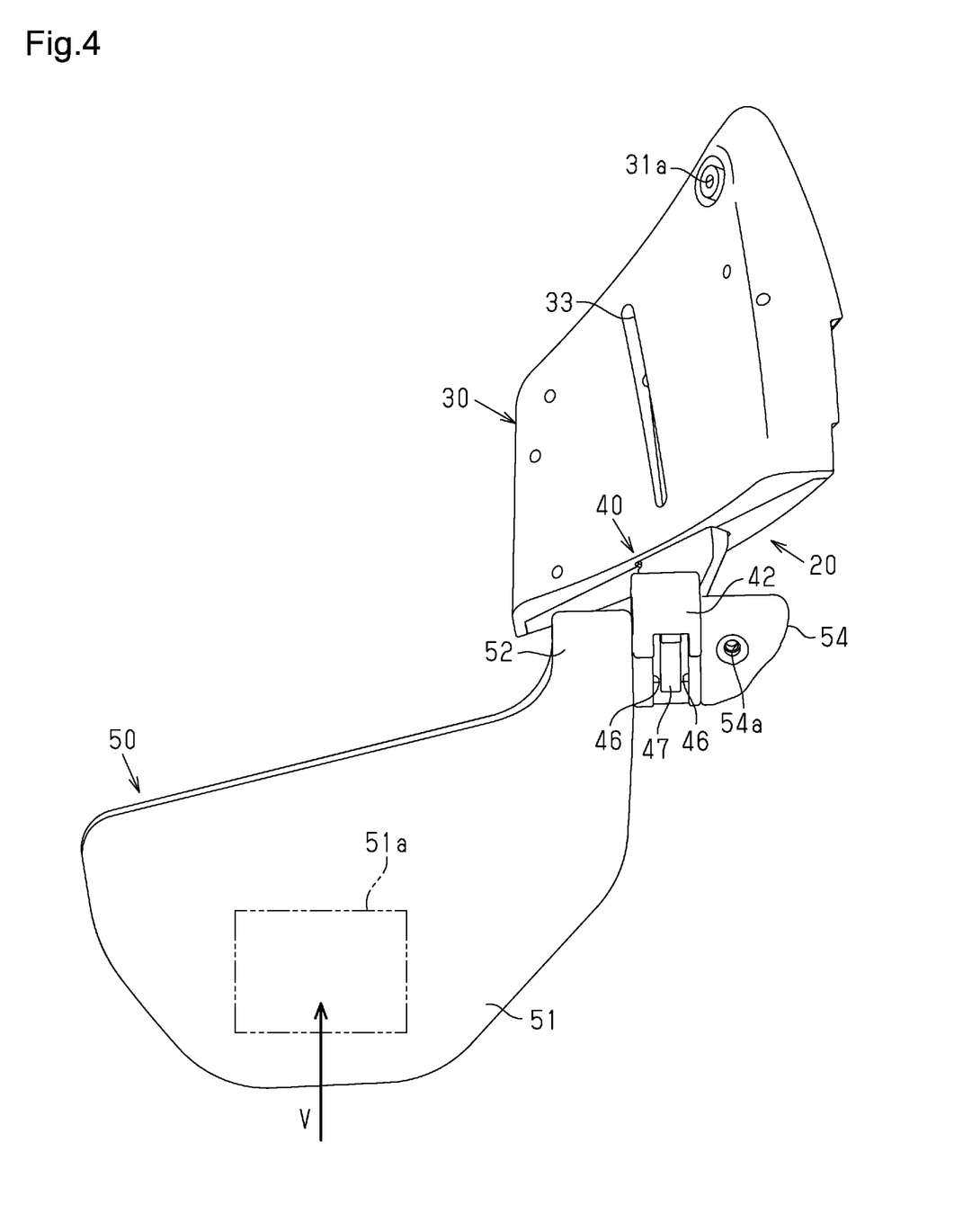
FIG. 4 is a perspective view of the screen device of FIG. 2.

As shown in FIG. 4, the rail portion 42 has a lower part that includes two slits 46 serving as through-holes and extending along the arcuate rail portion 42. An elastic portion 47 that extends from the front end and the rear end of the rail portion 42 is arranged between the two slits 46. The elastic portion 47 is thinner than other regions in the lower part of the rail portion 42 and thus flexible.

As shown in FIG. 3, the front region in the surface of the elastic portion 47 forming the inner surface of the rail hole 43 includes a first holding projection 47a projecting into the rail hole 43. The rear region in the surface of the elastic portion 47 forming the inner surface of the rail hole 43 includes a second holding projection 47b projecting into the rail hole 43. The first holding projection 47a and the second holding projection 47b press the supported portion 53 upward against a holding surface 48 that is the upper surface of the inner surface of the rail hole 43 to hold the combiner 50 in place.

Combiner

As shown in FIG. 4, the combiner 50 includes a projection surface 51 and an extension portion 52. The combiner 50 also includes the supported portion 53 (refer to FIG. 2). The projection surface 51 includes a display region 51a that is a transmissive screen. An image V, which is output from a projector 60 (refer to FIG. 5) arranged in the chin guard 2b, is projected onto the display region 51a.

The extension portion 52 extends from the projection surface 51 toward where the support 40 is located. The extension portion 52 connects the projection surface 51 and the supported portion 53. The supported portion 53 is flat and projects from the extension portion 52 toward the rail hole 43 of the support 40. The supported portion 53 is inserted into the rail hole 43 in the right-left direction.

The fastener 54 includes a hole into which the distal end of the supported portion 53 is inserted. The fastener 54 is attached to the distal end of the supported portion 53 of the combiner 50 with the supported portion 53 inserted into the rail hole 43. This holds the combiner 50 with the rail portion 42 in a state where the supported portion 53 is slidable along the rail hole 43.

Specifically, the distal end of the supported portion 53 includes a first fixing hole 53a (refer to FIG. 2). The fastener 54 includes a second fixing hole 54a at a portion that corresponds to the first fixing hole 53a when the fastener 54 is attached to the distal end of the supported portion 53. The fastener 54, attached to the distal end of the supported portion 53, is fixed to the distal end of the supported portion 53 when a screw fastens the first fixing hole 53a and the second fixing hole 54a. The extension portion 52 and the fastener 54 have surfaces perpendicular to the supported portion 53 that abut the opening surface of the rail hole 43. This reduces loosening of the combiner 50 relative to the rail portion 42.

The fastener 54 also serves as an operating portion that moves the combiner 50 along the arcuate rail portion 42. In other words, the fastener 54 is operated to move the supported portion 53 of the combiner 50 along the rail hole 43. The operation of the fastener 54 to move the combiner 50 along the arcuate rail portion 42 changes the angle of the projection surface 51 relative to the support 40.

The fastener 54 is arranged toward the opening 2a when the screen device 10 shown in FIG. 1 is attached to the helmet 1. The fastener 54, directed toward the opening 2a, is increased in thickness from the front portion to the rear portion to form a slope that facilitates touching with a finger of the wearer. Thus, the wearer can easily operate the fastener 54 using the finger to move the combiner 50 along the arcuate rail portion 42.

Projector

Figure 5:
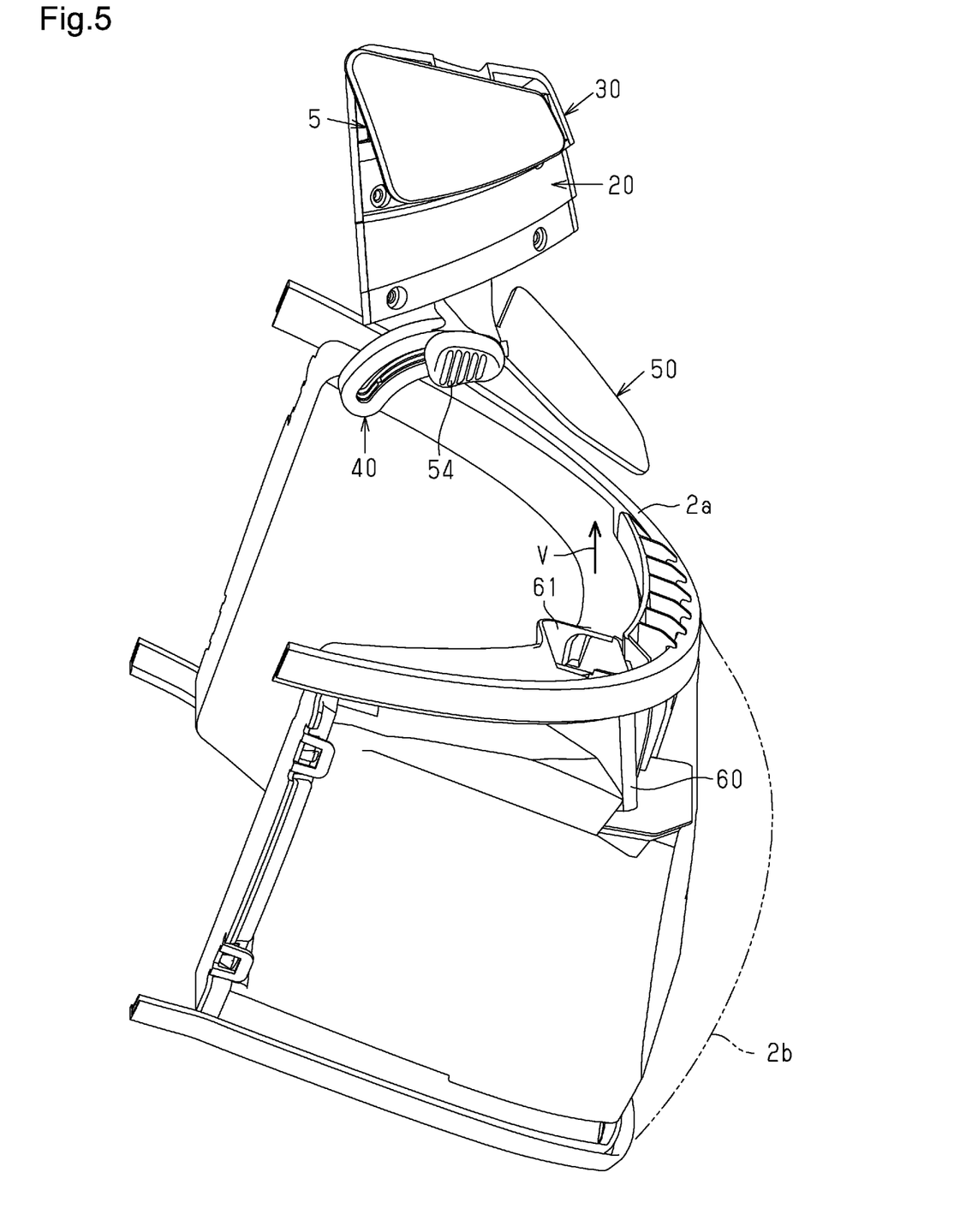
FIG. 5 is a perspective view of the screen device and a projector of the helmet of FIG. 1.

As shown in FIG. 5, the projector 60 is arranged in the chin guard 2b. The projector projects an image V from a projection outlet 61, arranged in a portion of the chin guard 2b forming the opening 2a, toward the projection surface 51.

Operation of Embodiment

Figure 8:
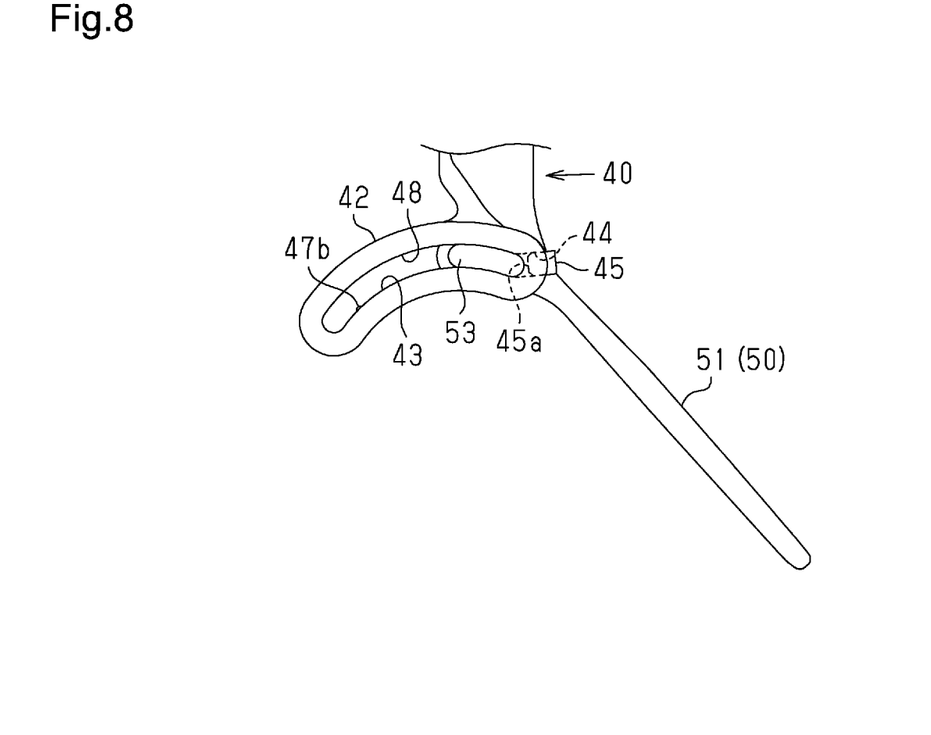
FIG. 8 is an enlarged view showing a positioner when the combiner of the helmet of FIG. 1 is located at the display position.
Figure 9:
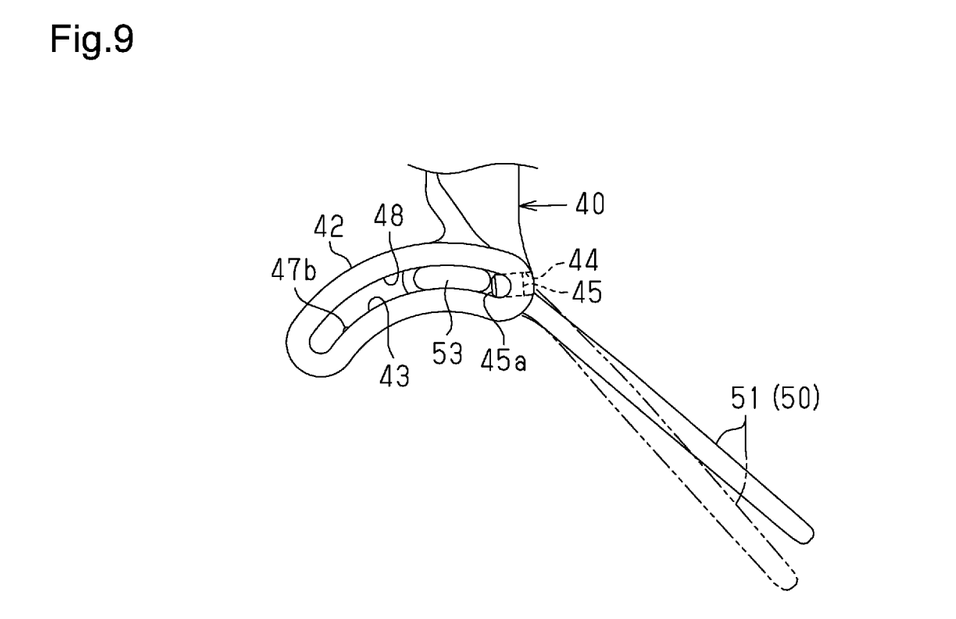
FIG. 9 is an enlarged view showing the positioner when the combiner of the helmet of FIG. 1 is located at the display position.

The operation of the present embodiment will now be described with reference to FIGS. 6 to 9. FIGS. 8 and 9 do not show the fastener 54 for sake of convenience.

Figure 6:
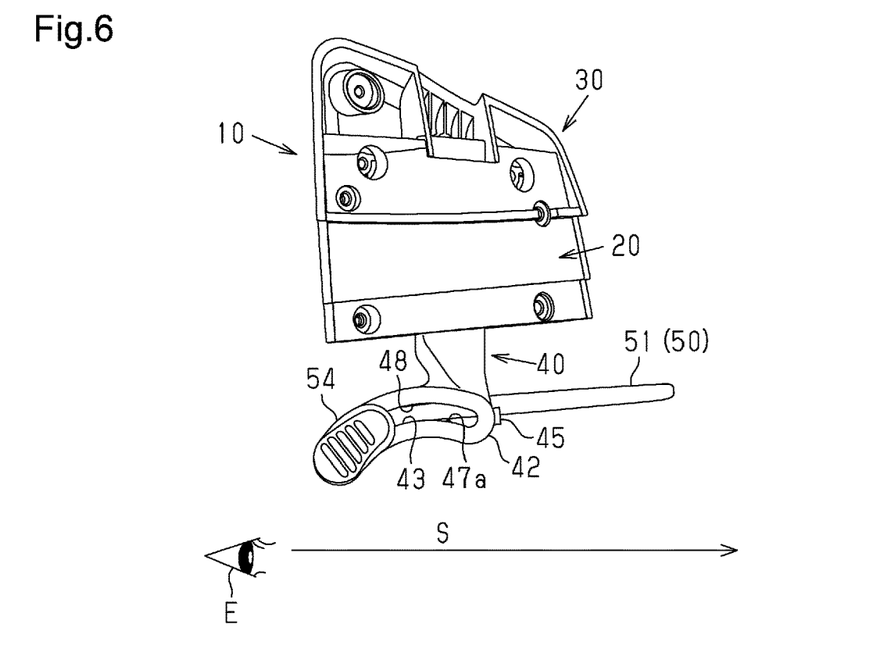
FIG. 6 is a diagram illustrating a combiner of the helmet of FIG. 1 located at a retraction position.

As shown in FIG. 6, when an image V is unnecessary and the combiner 50 is not used, the fastener 54 is operated to move the combiner 50 to a position where the supported portion 53 abuts the rear end of the rail portion 42. This arranges the combiner 50 at a retraction position where the projection surface 51 is retracted away from the front of a view point E of the wearer. The second holding projection 47b presses the supported portion 53 against the holding surface 48 so that the combiner 50 is held at the retraction position with the elastic force of the elastic portion 47. When the combiner 50 is arranged at the retraction position, the combiner 50 is not located in the line of sight S from the view point E of the wearer. This ensures that the line of sight S is not interfered by the image V of the combiner 50.

Figure 7:
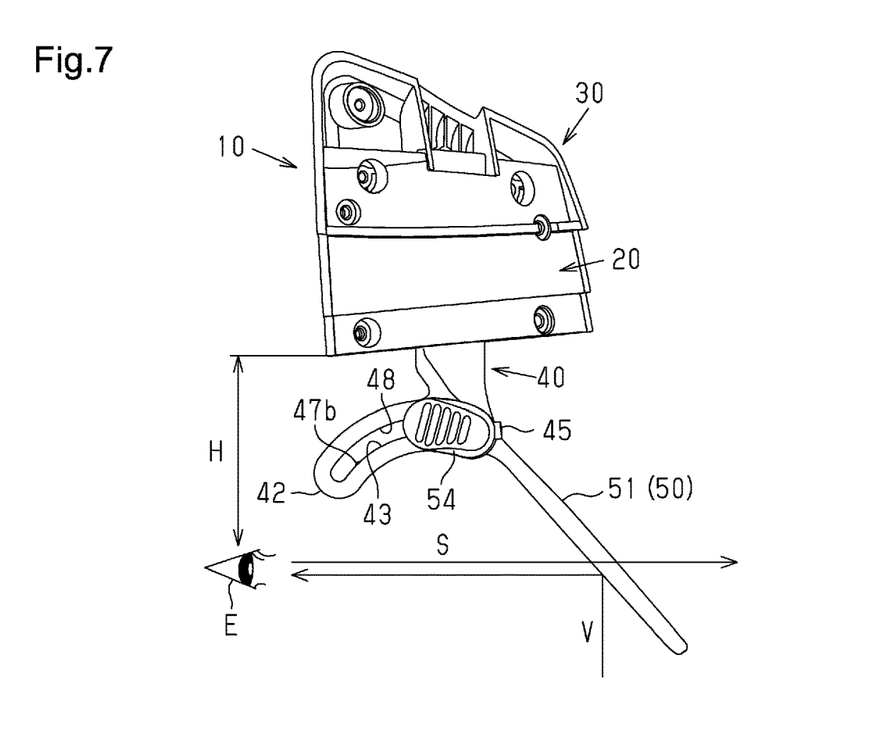
FIG. 7 is a diagram illustrating the combiner of the helmet of FIG. 1 located at a display position.

As shown in FIG. 7, when the combiner 50 is used, the fastener 54 is operated to move the combiner 50 to a position where the supported portion 53 abuts the front end of the rail portion 42. This arranges the combiner 50 at a display position where the projection surface 51 is arranged in front of the view point E of the wearer. In other words, the operation of the fastener 54 switches the combiner 50 between a state located at the display position and a state located at the retraction position. The first holding projection 47a presses the supported portion 53 against the holding surface 48 so that the combiner 50 is held at the display position with the elastic force of the elastic portion 47.

In this case, an image V output from the projector 60 is projected onto the projection surface 51 in the field of view of the wearer. This allows the wearer to be presented with the image V, projected onto the projection surface 51, in the line of sight S. Thus, the wearer can check the image V, projected onto the projection surface 51, while looking forward.

Further, when the combiner 50 is arranged at the display position, the wearer can move the support 40 vertically relative to the first member 20 and the second member 30 to adjust the position of the combiner 50 in the vertical direction in accordance with a height H of the view point E.

As shown in FIG. 8, when the distal end 45a of the screw 45, serving as the positioner, is located inside the screw hole 44, the supported portion 53 abuts the front end of the rail portion 42 to position the combiner 50. In this case, the first holding projection 47a presses the supported portion 53 against the holding surface 48 with the elastic force of the elastic portion 47 so that the combiner 50 is held while the supported portion 53 abuts the front end of the rail portion 42.

Further, the display position can be finely adjusted by rotating the screw 45, serving as the positioner, and projecting the distal end 45a into the rail hole 43. As shown in FIG. 9, when the display position is finely adjusted, the screw 45 is rotated to project the distal end into the rail hole 43. Thus, the supported portion 53 abuts the distal end 45a to position the combiner 50. In this case, the first holding projection 47a presses the supported portion 53 against the holding surface 48 so that the combiner 50 is held while the supported portion 53 abuts the distal end 45a of the screw 45 with the elastic force of the elastic portion 47. In FIG. 9, the long-dash double-short-dash line shows the position of the projection surface 51 of FIG. 8.

The display position is set by the position where the supported portion 53 abuts the distal end 45a when the distal end 45a of the screw 45 projects into the rail hole 43. Specifically, the screw 45 is moved in the thrust direction to adjust the display position in accordance with the driving posture or the like that is unique to the wearer so that the projection surface 51 is located at an optimal position in the field of view. In other words, the display position is a set position where the supported portion 53 abuts the distal end 45a of the screw 45 to position the combiner 50.

Further, the combiner 50 allows vertical movement of the support 40 relative to the first member 20 and the second member 30 to be independent from movement of the support 40 in the front-rear direction along the rail hole 43. Specifically, at any location in the vertical direction where the support 40 is positioned, the display position of the combiner 50 can be adjusted by moving the screw 45 to adjust the angle of the projection surface 51 relative to the rail portion 42 so that an image V displayed on the projection surface 51 is located at an optimal position in the field of view.

The combiner 50 is located at a position extremely near the view point E of the wearer between a front object such as a front vehicle or a road and the view point E of the wearer. Thus, a small difference in the angle of the projection surface 51 relative to the line of sight S will greatly change the position of an image V relative to the front object when viewed from the view point E of the wearer. Thus, in addition to the mechanism that greatly switches the position of the combiner 50 between the display position and the retraction position, it is preferred that the angle of the projection surface 51 at the display position be adjusted finely. In this respect, the angle of the projection surface 51 at the display position is set by the amount of the screw 45 projecting into the rail hole 43. This converts a large operation amount that rotates the screw 45 in the circumferential direction a number of times into a small movement of the screw 45 in the thrust direction. Thus, the angle of the projection surface 51 can be finely adjusted at the display position.

Advantages of the Embodiment

The above embodiment has the following advantages.

(1) The movement of the screw 45, serving as the positioner, in the thrust direction adjusts the display position of the combiner 50 in accordance with the driving posture or the like that is unique to the wearer so that an image V displayed on the projection surface 51 is located at an optimal position in the field of view. This allows the wearer to view the image V displayed on the projection surface 51 in a preferred manner.

(2) The supported portion 53 abuts the distal end 45a of the screw 45 to adjust the display position where the supported portion 53 is held by the first holding projection 47a. Thus, the display position is adjusted by a simple structure and a simple operation of rotating the screw 45 and moving the distal end 45a, serving as the abutment portion, in the thrust direction.

(3) A large rotation operation performed on the screw 45, serving as the positioner, is converted into a small movement of the screw 45 in the thrust direction so that the angle of the projection surface 51 relative to the rail portion 42 is adjusted finely at the display position. This allows the wearer to view the image V displayed on the projection surface 51 in a further preferred manner.

(4) The combiner 50 allows for the movement of the support 40 in the vertical direction relative to the first member 20 and the second member 30 to be independent from the movement of the support 40 in the front-rear direction along the rail hole 43. This adjusts the angle of the projection surface 51 relative to the rail portion 42 at each location in the vertical direction where the support 40 is positioned.

The above embodiment may be modified as follows.

Although the screw 45 serves as the positioner in the above embodiment, the positioner does not need to be the screw 45. For example, the screw 45 may be replaced by a rack with a saw-toothed side surface, the screw hole 44 may be replaced by a through-hole into which the rack is inserted, and a mechanism may drive the rack inside the through-hole. In the above structure, the distal end of the rack abuts the supported portion 53 to position the combiner 50 at the display position. In other words, the rack serves as the positioner that adjusts the display position, and the distal end of the rack serves as the abutment portion that abuts the supported portion 53 of the combiner 50. The above structure will adjust the display position in accordance with the amount of the rack projecting into the rail hole 43.

In the above embodiment, the display position is set when the supported portion 53 abuts the distal end 45a (abutment portion) of the screw 45 and the combiner 50 is positioned. The positioner does not need to be the screw 45 including the distal end 45a (abutment portion). The positioner only needs to position the supported portion 53 inserted into the rail hole 43. For example, the positioner may include a fitting member attached to the rail portion 42 in a manner allowing for positional adjustment. The display position may be set when the fitting member fitted onto the supported portion 53 is moved along the rail portion 42 at the display position. Alternatively, the supported portion 53 may include a magnetic body, and the positioner may include a magnetic member attached to the rail portion 42 in a manner allowing for positional adjustment. The display position may be set when the magnetic member magnetically coupled to the supported portion 53 is moved along the rail portion 42 at the display position.

In the above embodiment, the screw 45, serving as the positioner, is arranged at the front end of the rail portion 42. In addition, another screw 45 may be arranged at, for example, the rear end of the rail portion 42. In this case, the screw 45 arranged at the rear end of the rail portion 42 positions the combiner 50 at the retraction position. In other words, the display position and the retraction position are both set positions where the combiner 50 is positioned in accordance with the locations of the distal ends 45a of the screws 45 serving as the positioners. The retraction position is a set position allowing the combiner 50 to be retracted to a preferable position in accordance with the driving posture or the like of the wearer and reduces the amount of movement when switching between the display position and the retraction position. The screw 45, serving as the positioner, may be arranged only at the rear end of the rail portion 42, and the screw 45 may be omitted from the front end of the rail portion 42.

The supported portion 53 may include one or more engagement recesses that are engaged with the first holding projection 47a at the display position and the second holding projection 47b at the retraction position. For example, when the supported portion 53 includes plural engagement recesses, the first holding projection 47a is engaged with the engagement recess at positions where the display position is adjusted by the positioner so that the combiner 50 is supported in a preferred manner. There may be more than one of each of the first holding projection 47a and the second holding projection 47b.

In the above embodiment, the screen device 10 is arranged in the helmet body 2. However, the screen device 10 may be arranged in any member other than the helmet body 2 such as the liner as long as the screen device 10 is suitably arranged in the helmet 1.

In the above embodiment, the projector 60 is arranged in the chin guard 2b. However, the projector 60 may be arranged in any member as long as an image V output from a certain position inside the helmet 1 is projected onto the projection surface 51.

In the above embodiment, the helmet 1 is a full-face helmet. Instead, the helmet 1 may be a flip-up helmet with a chin guard that can be raised, an open face helmet, a helmet with a removable chin guard, or a convertible helmet with a chin guard that is pivoted and fixed to the back of the helmet.

The invention claimed is:

1. A screen device configured to be attached to a helmet, the screen device comprising:
    a support including an arcuate-shaped rail portion that supports a combiner; and
    the combiner including a projection surface, onto which an image projected from a projector attached to the helmet is presented, and a supported portion, supported by the arcuate-shaped rail portion, wherein
    the arcuate-shaped rail portion comprises an arcuate-shaped rail hole that extends along the arcuate-shaped rail portion,
    the supported portion is inserted into the arcuate-shaped rail hole and movable along a length of the arcuate-shaped rail hole,
    when the supported portion abuts a front end of the arcuate-shaped rail portion, the combiner is located at a display position where the projection surface is arranged in front of a wearer of the helmet,
    when the supported portion abuts a rear end of the arcuate-shaped rail portion, the combiner is located at a retraction position where the projection surface is retracted away from the front of the wearer,
    the support further includes a positioner that positions the supported portion supported by the arcuate-shaped rail portion, wherein the positioner includes an abutment portion configured to position the supported portion by abutting the supported portion, and
    the positioner is arranged in at least one of the front end and the rear end of the arcuate-shaped rail portion and movable in a thrust direction, and
    the positioner is configured to project into the arcuate-shaped rail hole and set a movable range of the supported portion in the arcuate-shaped rail hole when the positioner is externally operated.

2. The screen device according to claim 1, wherein the abutment portion is configured to abut the supported portion to position the supported portion at the display position.

3. The screen device according to claim 1, wherein the positioner is configured to position the supported portion by rotating a screw including the abutment portion to move the abutment portion.

4. The screen device according to claim 3, wherein the positioner is configured to position the supported portion by rotating the screw including the abutment portion to move the abutment portion in a thrust direction.

5. A helmet including a screen device and a projector that projects an image on the screen device, the screen device comprising:
    a support including an arcuate-shaped rail portion that supports a combiner; and
    the combiner including a projection surface, onto which the image projected from the projector is presented, and a supported portion, supported by the arcuate-shaped rail portion, wherein
    the arcuate-shaped rail portion comprises an arcuate-shaped rail hole that extends along a length of the arcuate-shaped rail portion,
    the supported portion is inserted into the arcuate-shaped rail hole and movable along the length of the arcuate-shaped rail hole,
    when the supported portion abuts a front end of the arcuate-shaped rail portion, the combiner is located at a display position where the projection surface is arranged in front of a wearer of the helmet,
    when the supported portion abuts a rear end of the arcuate-shaped rail portion, the combiner is located at a retraction position where the projection surface is retracted away from the front of the wearer,
    the support further includes a positioner that positions the supported portion supported by the arcuate-shaped rail portion, wherein the positioner includes an abutment portion configured to position the supported portion by abutting the supported portion, and
    the positioner is arranged in at least one of the front end and the rear end of the arcuate-shaped rail portion and movable in a thrust direction, and
    the positioner is configured to project into the arcuate-shaped rail hole and set a movable range of the supported portion in the arcuate-shaped rail hole when the positioner is externally operated.

* * * * *